(12) United States Patent
Kohler et al.

(10) Patent No.: US 6,772,020 B2
(45) Date of Patent: Aug. 3, 2004

(54) ARRANGEMENT FOR GENERATING COMMAND VARIABLES FOR CONTROL LOOPS OF A NUMERICALLY CONTROLLED MACHINE

(75) Inventors: Frieder Kohler, Lauter (DE); Matthias Fauser, Burgwedel (DE)

(73) Assignee: Johannes Heidenhain GmbH, Traunreut (DE)

( * ) Notice: Subject to any disclaimer, the term of this patent is extended or adjusted under 35 U.S.C. 154(b) by 111 days.

(21) Appl. No.: 10/038,051

(22) Filed: Jan. 4, 2002

(65) Prior Publication Data

US 2003/0033029 A1 Feb. 13, 2003

(30) Foreign Application Priority Data

Aug. 11, 2001 (DE) ......................................... 101 39 638

(51) Int. Cl.[7] .............................................. G05F 19/00
(52) U.S. Cl. ........................ 700/73; 700/186; 700/189; 318/570
(58) Field of Search ................................. 700/186–189, 700/170, 252, 73; 318/568.15, 573, 570

(56) References Cited

U.S. PATENT DOCUMENTS

| | | | | |
|---|---|---|---|---|
| 4,398,228 A | * | 8/1983 | Bauck | ..................... 360/77.02 |
| 4,603,286 A | | 7/1986 | Sakano | |
| 4,772,831 A | | 9/1988 | Casler, Jr. et al. | |
| 4,858,140 A | | 8/1989 | Bühler et al. | |
| 4,903,213 A | | 2/1990 | Bühler et al. | |
| 5,434,489 A | * | 7/1995 | Cheng et al. | .......... 318/568.15 |
| 5,852,524 A | * | 12/1998 | Glover et al. | ................. 360/51 |
| 6,084,374 A | * | 7/2000 | Nakatsuka et al. | .... 318/568.18 |
| 6,401,006 B1 | | 6/2002 | Mizuno et al. | |

FOREIGN PATENT DOCUMENTS

| | | |
|---|---|---|
| DE | 43 03 090 | 8/1994 |
| EP | 0 270 060 | 6/1988 |
| EP | 0 864 952 | 9/1998 |
| EP | 0 917 033 | 5/1999 |
| JP | 06 180606 | 6/1994 |
| WO | WO 01/18622 | 3/2001 |

OTHER PUBLICATIONS

W. Hess et al., "Digitale Filter," published by B.G. Teubner, Stuttgart, 1993, pp. 302–303.
Matthias Fauser, "Steuerungstechnische Massnahmen fur die Hochgeschwindigkeits–Bearbeitung," dissertation published by Shaker Verlag, Aachen, Jul., 1997, pp. 60–109.

* cited by examiner

*Primary Examiner*—Emanuel Todd Voeltz
(74) *Attorney, Agent, or Firm*—Brinks Hofer Gilson & Lione

(57) ABSTRACT

An arrangement for generating command variables for control loops of a numerically controlled machine that includes an interpolator unit for providing position set points with a defined interpolator scanning rate and a precision interpolator unit. The precision interpolator unit includes a scanning rate converter and a downstream-connected low-pass filter, wherein the precision interpolator unit is arranged downstream of the interpolator unit, which generates command variables at an output side from position set points at an input side for one or several downstream-connected control loops, wherein the precision interpolator unit generates command variables in a time pattern of the control loops with a control loop scanning rate.

19 Claims, 3 Drawing Sheets

ARRANGEMENT FOR GENERATING COMMAND VARIABLES FOR CONTROL LOOPS OF A NUMERICALLY CONTROLLED MACHINE

Applicants claim, under 35 U.S.C. §119, the benefit of priority of the filing date of Aug. 11, 2001 of a German patent application, copy attached, Serial Number 101 39 638.4, filed on the aforementioned date, the entire contents of which is incorporated herein by reference.

BACKGROUND OF THE INVENTION

1. Field of the Invention

The present invention relates to an arrangement for generating command variables for control loops of a numerically controlled machine, including an interpolator unit and a precision interpolator unit arranged downstream of the interpolator unit.

2. Discussion of Related Art

In numerically controlled machine tools or robots the generation of set points for position, speed and acceleration as the command variables for the control loops of the respective control loops customarily takes place in interpolator units which are arranged upstream of the control loops. For this purpose the desired geometric shaft movement functions and speed profiles are preset at the input of the interpolator units. On the output side, the interpolator unit provides discrete sequences of set points, or scanning values, on a path curve. The set points are output to the downstream located control loop at a defined, customarily fixed interpolator scanning time $T_{IPO}$ as command variables. Before being passed on to the position control loop, the command values generated by the interpolator unit are furthermore additionally filtered in a set point filter, as a rule in the form of digital low-pass filtering, in order to achieve smoothing of the path curve by means of this.

Such an arrangement in accordance with the species is known from International Patent Application WO 01/18622 of Applicant. Measures showing how a suitable position set point filter in the form of an FIR (Finite Impulse Response) filter can be produced with the lowest possible computing outlay are particularly proposed in this application. It furthermore has also been disclosed in this application that it is necessary for the generation of command variables within the time pattern of the control loops to arrange a precision interpolator unit between the set point filter and the control loops, for example the position control loop. The interpolator scanning time $T_{IPO}$, which typically lies in the range $T_{IPO}=[1 \ldots 6 \text{ ms}]$, or the interpolator scanning rate, are matched to the control loop scanning time $T_{Ctrl}$ of the downstream-connected control loop, or to the control loop scanning rate, with the aid of the precision interpolator unit. The control loop scanning time $T_{Ctrl}$ lies approximately in the range $T_{Ctrl}=[100 \ldots 800 \,\mu s]$ and is this clearly less than the interpolator scanning time $T_{IPO}$, or the control loop scanning rate is clearly greater than the interpolator scanning rate. However, details regarding the exact design of the precision interpolator unit cannot be found in this document.

Moreover, a similar architecture of a numerical control has also already been disclosed in the preamble of the specification of DE 43 03 090 A1; however, no suggestions for embodying the precision interpolator unit in a suitable manner can be found in this document, either.

The adaptation of the interpolator scanning time $T_{IPO}$ to the control loop scanning time $T_{Ctrl}$ of the downstream-connected control loop is usually achieved by very elaborate methods. For example, in this connection it is known from EP 0 917 033 A2 to perform a so-called polynomial interpolation, or a spline interpolation. However, despite the enormous computing outlay, this type of precision interpolation also provides resultant path curves with undesirable overswings.

Moreover, linear precision interpolation is also employed there. But this method leads to undesirable excitations of the drive systems at the respective segment transitions.

OBJECTS AND SUMMARY OF THE INVENTION

It is therefore an object of the present invention to disclose a practical way in which to produce a precision interpolator unit in connection with an arrangement in accordance with the species for the generation of command variables for control loops of a numerically controlled machine. In this case, the precision interpolator unit should process the position set point generated by an interpolator unit of a defined interpolator scanning rate in such a way that command variables for downstream-connected control loops result within the time pattern of the control loop scanning rate. Demanded are, besides the lowest possible computing outlay for the precision interpolation, the best possible quality of the resultant path curves.

This object is attained by an arrangement for generating command variables for control loops of a numerically controlled machine that includes an interpolator unit for providing position set points with a defined interpolator scanning rate and a precision interpolator unit. The precision interpolator unit includes a scanning rate converter and a downstream-connected low-pass filter, wherein the precision interpolator unit is arranged downstream of the interpolator unit, which generates command variables at an output side from position set points at an input side for one or several downstream-connected control loops, wherein the precision interpolator unit generates command variables in a time pattern of the control loops with a control loop scanning rate.

It is therefore provided in accordance with the present invention to implement the precision interpolator unit with the aid of a scanning rate converter and a downstream-connected digital filter. In this connection, the measure of embodying the digital filter as an FIR filter has been shown to be particularly advantageous. It is possible in this way to combine the running arithmetic operations of the scanning rate converter and of the FIR filter. The input vector of the FIR filter contains a large number of zero values because of the insertion, performed by the scanning rate converter, of intermediate values of the value zero in the time pattern of the control loop scanning rate between the set point values at the input side. Each zero value present at the FIR filter input results in arithmetic operations by the FIR filter whose initial value is again zero. This fact is now used by the present invention, i.e. it is not necessary to perform the operations with an initial value of zero. Instead, for a sequence of input values several interpolated initial values are calculated with the aid of several filter coefficient sets, wherein the number of filter coefficient sets required for this corresponds to the desired interpolation factor. In this way only a small computing outlay by the precision interpolator unit is required.

An excellent quality of the path curve resulting at the end should be mentioned as a further advantage of the arrangement in accordance with the present invention. The reason for this is that an almost exact reconstruction of the output signal is possible by the type of precision interpolation selected, as long as the scanning theorem had not been violated during the interpolation.

Further details of the present invention ensue from the following description of an exemplary embodiment by the attached drawings.

DETAILED DESCRIPTION OF THE PREFERRED EMBODIMENTS

Figure 1:
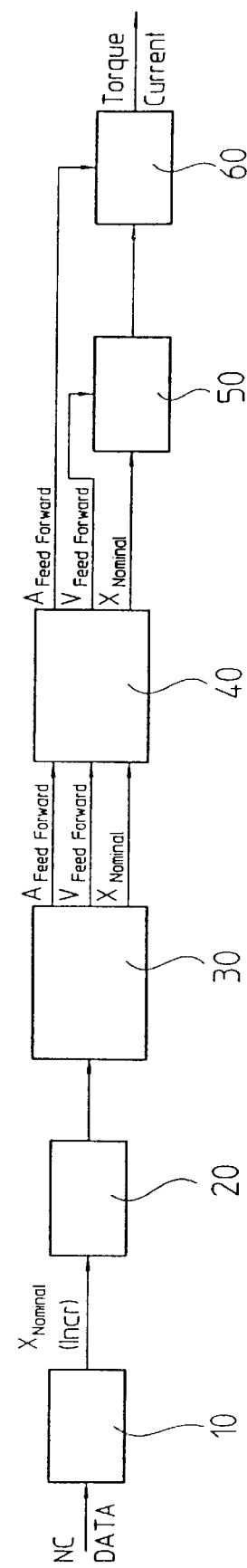
FIG. 1 is a schematic block diagram of a portion of an embodiment of a numerical machine tool control in accordance with the present invention.

A portion of a numerical machine tool control in which a precision interpolator unit in accordance with the present invention is employed, is represented in schematic form in FIG. 1.

For generating the tool path data in the numerical machine tool control, the NC (Numerical Control) data are initially converted in an interpolator 10 into a sequence of position set points $X_{Nominal,INCR}$ with a defined interpolator scanning rate, or interpolator scanning time $T_{IPO}$. Usually the interpolator scanning time $T_{IPO}$ here lies within an order of magnitude $T_{IPO}$=[1 ms . . . 6 ms]. Following further processing—to be described in what follows—the position set points $X_{Nominal}$ are transferred as command variables $X_{Nominal}$, $V_{Feedforward}$ and $A_{Feedforward}$ to control loops 50, 60 in the form of a position control and a speed control. In this case the control loops 50, 60 have clearly shorter scanning times $T_{Ctrl}$ on an order of magnitude $T_{Ctrl}$=[100 μs . . . 800 μs]. In the present example, the control of the movement of a tool along a desired path curve is provided in a known maimer in the end by the control loops 50, 60 on the basis of the transferred command variables.

Pre-processing of the NC data takes place, inter alia, prior to transferring the NC data to the interpolator 10, in that a suitable course of the path speed is determined while taking into consideration various marginal conditions. In order to prevent a dynamic overload of the drive system in particular, it is assured that physical limits of the drive systems are not exceeded by the command variables during pre-processing of the NC data. In this case, a band limitation of the speed profile results in the end, in that a chronological stretching of the course of the movement takes place at critical locations. Regarding the methods suitable for this, reference is made here to chapter 7 (pp. 60 to 108) of the dissertation of M. Fauser, "Steuerungstechnische Maβnahmen für die Hochgeschwindigkeits-Bearbeitung" [Technical Control Steps for High-Speed Processing], published by Shaker, Aachen, 1997.

The importance of this step will be covered in greater detail in the course of the following description. In accordance with this, the position set points $X_{Nominal,INCR}$ generated by the interpolator 10 are digitally filtered by a position set point filter 20 embodied as an FIR filter in order to assure that the command variables transmitted to the control loops 50, 60 no longer contain frequency portions which possibly might excite resonances in the machine. The digital filter 20 employed at this point acts as a low-pass filter, which lets through frequency portions up to a threshold frequency $f_G$ and blocks frequency portions starting at the threshold frequency $f_G$. As a rule, the filter threshold frequency $f_G$ is set lower than the resonance frequency $f_{Res}$ of the machine tool, $f_G$=$f_{Res}$. Regarding the position set point filter 20, reference is made to the already mentioned WO 01/18622.

The filtered position set points $X_{Nominal,INCR}$ are subsequently further processed with the aid of the precision interpolator unit 30, wherein the generation of command variables $X_{Nominal}$, $V_{Feedforward}$ and $A_{Feedforward}$ for the downstream-connected control loops 50, 60 in the time pattern of the control loops 50, 60, or the generation of command variables at the control loop scanning rate, essentially takes place via the precision interpolator unit 30. The command variables $X_{Nominal}$ for the downstream-connected control loop 50, as well as the pre-control values $V_{Feedforward}$ and $A_{Feedforward}$ for the position control loop 50 and the rpm control loop 60, are mentioned here as command variables. Therefore, the precision interpolator unit 30 designed in accordance with the present invention takes on the job of matching the low scanning rate of the interpolator 10 to the higher scanning rate of the control loops 50, 60; in what follows, the ratio of the interpolator scanning rate and the control loop scanning rate is called the interpolation factor. An increase of the interpolator scanning rate by the interpolation factor IF to the control loop scanning rate customarily takes place here. Typical interpolation factors IF lie in the range IF=[2 . . . 60], for example.

The interpolator scanning rate is not selected to be as high as the control loop scanning rate here since, as known from WO 01/18622 of Applicant, the selection of the interpolator scanning rate as a function of the respective machine-specific resonance frequency $f_{Res}$, allows for a simpler implementation of the FIR filter 20. The above mentioned typical interpolator scanning times $T_{IPO}$=[1 ms . . . 6 ms] result from the customary resonance frequencies in the range of $f_{Res}$=[20 Hz . . . 100 Hz].

Figure 2:
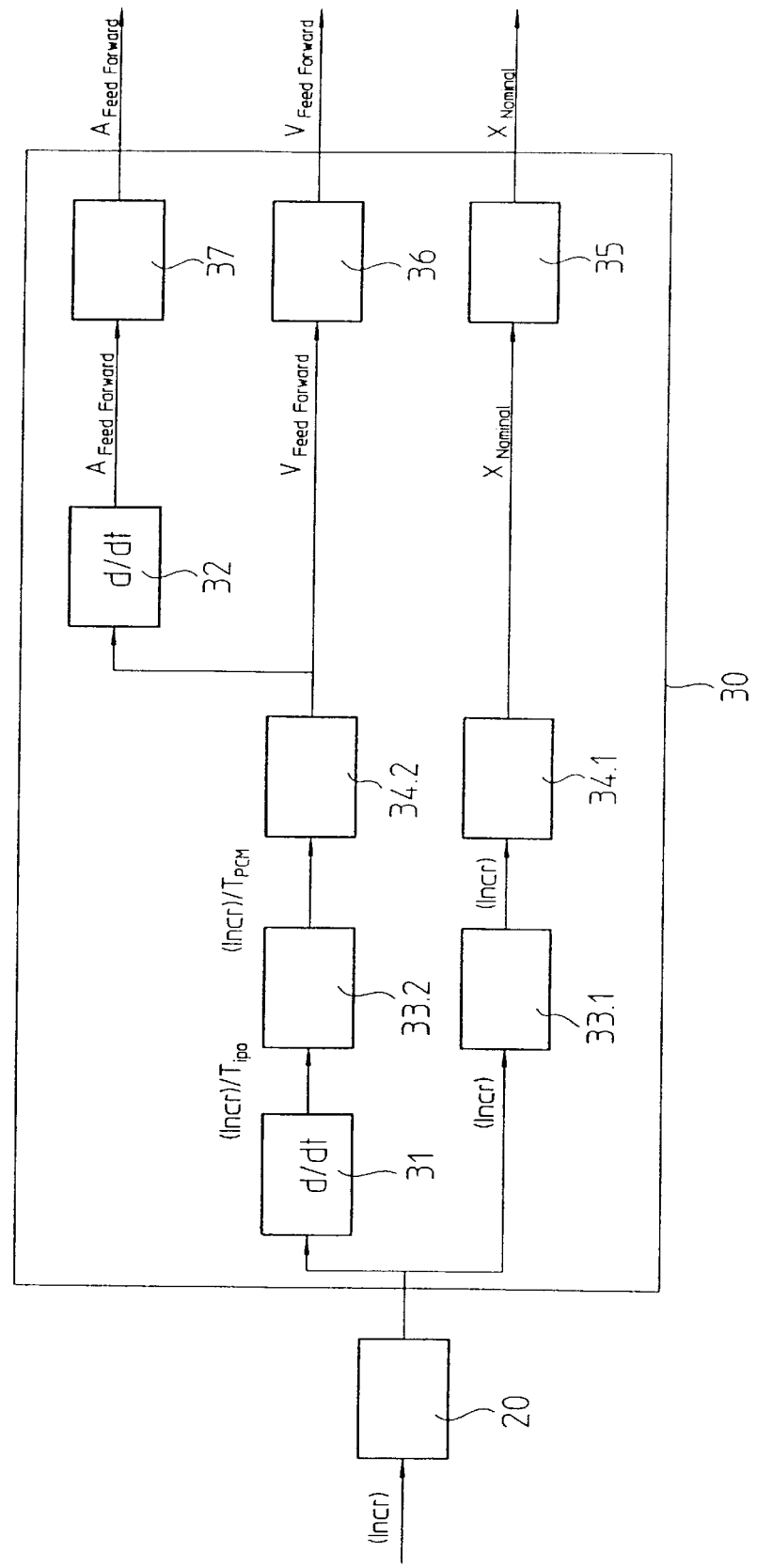
FIG. 2 is a schematic block diagram of an exemplary embodiment of an arrangement to be used with the numerical machine tool control of FIG. 1 in accordance with the present invention.
Figure 3:
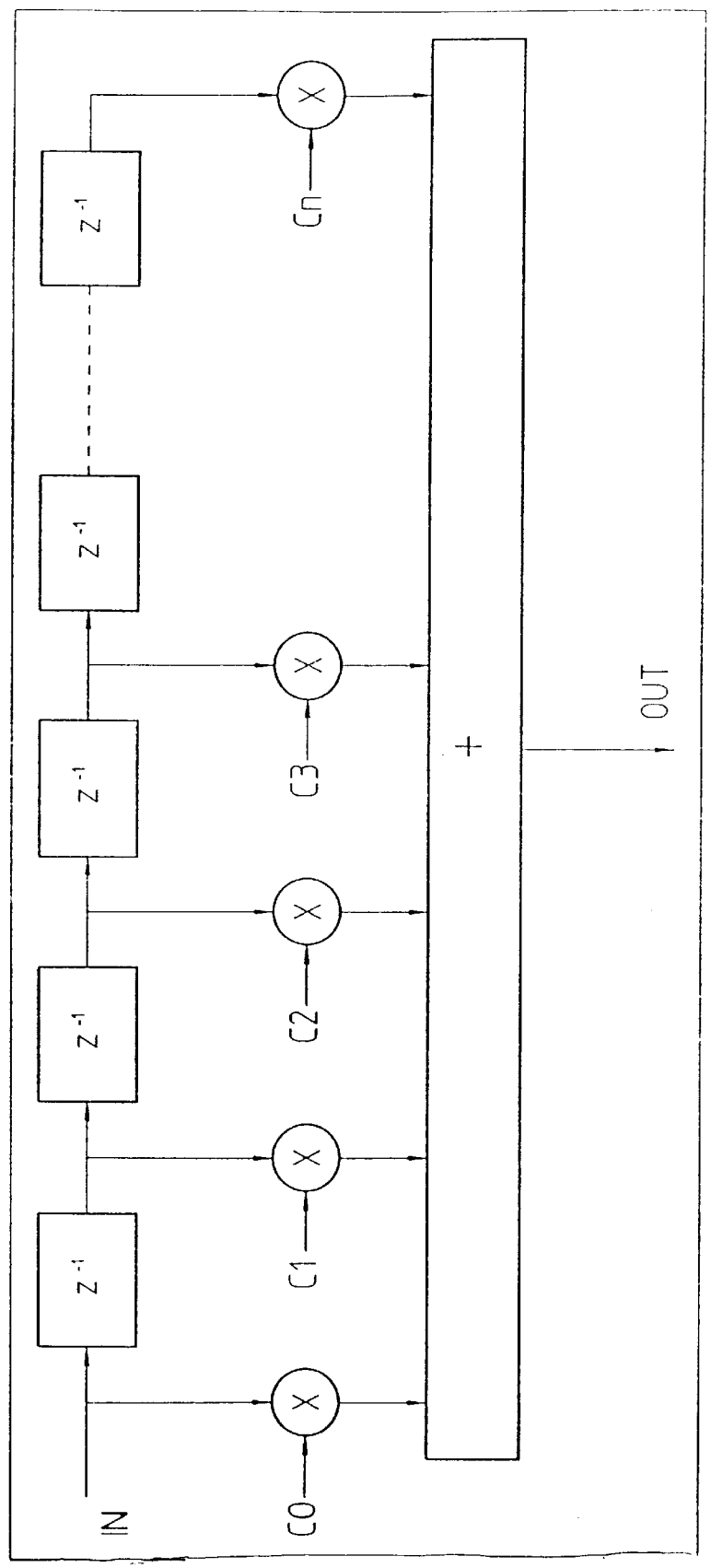
FIG. 3 is a schematic representation of an embodiment of a digital FIR filter employed in the arrangement of FIG. 2.

Regarding the actual embodiment in accordance with the present invention of the precision interpolator unit 30, reference is made to the description of FIGS. 2 and 3 which follows.

In the example in FIG. 1, a further synchronization unit 40 has been arranged between the precision interpolator unit 30 and the control loops 50, 60. In this case, the job of the synchronization unit 40 includes the chronological synchronization of the various command variables $X_{Nominal}$, $V_{Feedforward}$, $A_{Feedforward}$ generated for different machine shafts. Such synchronization is required in a multi-shaft machine tool because the command variables $X_{Nominal}$, $V_{Feedforward}$, $A_{Feedforward}$ transmitted by the precision interpolator unit relate to a different point in time than those required by the downstream connected control loops 50, 60; in particular if the control of different shafts takes place sequentially. It is therefore necessary to perform a suitable delay of the command variables $X_{Nominal}$, $V_{Feedforward}$, $A_{Feedforward}$ for different shafts transmitted to the control loops via the synchronization unit 40.

The basic structure of an exemplary embodiment of the precision interpolator unit 30 is schematically represented in FIG. 2. In this case, the precision interpolator unit 30 is preferably implemented on a digital signal processor (DSP), whose architecture has been optimized for computing digital filters. Alternatively to this an implementation on a CPU is also possible.

In the example shown, the precision interpolator unit 30 has two processing channels, in which the command variables $X_{Nominal}$, $V_{Feedforward}$ with respect to position and speed of the tool are generated for the downstream-connected position and speed control loops. Moreover, by differentiation via the differentiating member 32, the acceleration-related command variable $A_{Feedforward}$ is also derived from the processing channel for generating the speed-related command variable $V_{Feedforward}$. However, it is stressed at this point that it would be possible alternatively to this to embody the precision interpolator unit 30 only with one channel and to derive the command variables $V_{Feedforward}$, $A_{Feedforward}$ in regard to speed and acceleration from the position set points $X_{Nominal}$ by a one-time or double differentiation.

With the exception of the differentiating member 31, the two processing channels of the precision interpolator unit 30 basically have an identical structure, which will be explained in what follows. Each one of the two processing channels of the precision interpolator unit 30 respectively has a scanning rate converter 33.1, 33.2, as well as a downstream-connected digital filter 34.1, 34.2. The above mentioned matching of the low interpolator scanning rate to the clearly higher control loop scanning rate respectively takes place with the aid of the scanning rate converter 33.1, 33.2, as well as the digital filter 34.1, 34.2.

First, the scanning rate of the set points at the input side is increased from the interpolator scanning rate to the control loop scanning rate via the scanning rate converter 33.1, 33.2. For this purpose, intermediate values of the value zero in the time pattern of the control loop scanning rate are inserted into the original time pattern of the set points at the input side by the scanning rate converter 33.1, 33.2. Accordingly, a signal with the desired, or required, scanning rate of the downstream-connected control loop is present in the two processing channels at the output of the scanning rate converter 33.1, 33.2 and is thereafter supplied to the respective digital filter 34.1, 34.2 for smoothing, or elimination, of undesired frequency components. Note that an example of increasing frequency via the insertion of zero values is described at pages 302–303 of "Digital Filters," by W. Hess and Teubner Verlag, published in 1993. In that article, a low pass filtering process was performed after the insertion of the zero values. The low pass filtering process weighted the zero values so that an output signal with an increased scanning rate is generated.

The digital filter 34.1, 34.2 is embodied as an FIR filter, to which various filter coefficient sets have been assigned. The various filter coefficient sets can be stored in a memory unit, for example, which is assigned to the FIR filter. Now a respective computation of several output values for a defined sequence of input values takes place in the FIR filter, in that the respective sequence of input values is filtered, using the various filter coefficient sets.

Then the respective desired signals with scanning rates increased with respect to the control loop scanning rates are present at the output of the FIR filters 34.1, 34.2, which in the end are transmitted to the respective downstream-connected control loops as set points, or command variables $X_{Nominal}$, $V_{Feedforward}$, $A_{Feedforward}$.

Because of the embodiment in accordance with the present invention of the precision interpolator unit 30, the result is, besides a very high quality of the generated path curve, a comparatively low computation outlay. In particular, in the known frequency increasing process described in the "Digital Filters" article mentioned previously, the final output signal is generated by conducting low pass filtering for each zero value inserted. The present invention avoids such numerous low pass filtering of the inserted zero values. In particular, avoiding numerous low pass filtering resulting in a comparatively low computation outlay is assured in particular by the design of the digital filter(s) 34.1, 34.2 as FIR filters. Because of this it is possible to combine the arithmetic operations of the scanning rate converter(s) 33.1, 33.2 and of the FIR filter. Based on the insertion of intermediate values of the value zero in the time pattern of the control loop scanning rate between the set points at the input side performed by the scanning rate converter 33.1, 33.2, the input vector of the FIR filter 34.1, 34.2 contains a large number of zero values. Each zero value present at the FIR filter input leads to arithmetic operations by the FIR filter 34.1, 34.2 whose output value is again zero. This fact is now used in accordance with the present invention, i.e. the arithmetic operations with the value zero need not be performed. Instead, filtering is conducted on the initial input signal prior to the insertion of zero values. In particular, several interpolated output values, or intermediate values, are computed for a defined sequence of input values with the aid of several filter coefficient sets, wherein the number of filter coefficient sets required for this corresponds to the desired interpolation factor IF by which the interpolated scanning rate is increased to equal the control loop scanning rate. To get the necessary number of intermediate values, each input value is filtered with a given number of different filter coefficients. Each conducted filtering process with modified filter coefficients produces an additional intermediate value, which results in an increase in the scanning rate. For example, two additional filtering processes with corresponding different sets of filter coefficients produce an increase in the scanning rate by a factor of 2 (the interpolation factor). Note that each one of the filter coefficient sets used has the same amplitude cycle, in contrast to that, as a derivation from the phase cycle, the phase cycle, or the group running time, varies from filter coefficient set to filter coefficient set by one scanning period of the control loop scanning rate. The intermediate values in the required scanning pattern result at the output side.

In order to be able to perform this type of precision interpolation in the form of digital filtering, the pre-processing, already mentioned above, of the NC data in the form of a band limitation of the signals, which are transmitted to the position set point filter 20 and subsequently to the precision interpolator unit 30, is required. Only such a band limitation makes the digital filtering in accordance with the present invention in the precision interpolator unit 30 possible in the end; otherwise undesirable alias effects caused by the filtering would lead to the falsification of the precision-interpolated signal course.

In connection with the transmission of the command variables $X_{Nominal}$, $V_{Feedforward}$, $A_{Feedforward}$, generated by the precision interpolator unit 30, to the various control loops it is now furthermore necessary to assure that the respective various command variables $X_{Nominal}$, $V_{Feedforward}$, $A_{Feedforward}$ are all correlated to the same point in time, or the same chronological basis. This is achieved by compensation members, such as retardation members 35, 36, 37 at the output side of the precision interpolator unit 30, each of which causes a defined dead period in the processing channels and which in the end assure the same chronological basis for the generated command variables $X_{Nominal}$, $V_{Feedforward}$, $A_{Feedforward}$.

Such compensation members can also be provided in a single-channel embodiment of the precision interpolator unit in order to assure the correlation of the generated command variable with the same chronological basis.

Finally, a schematic representation of the digital filter 34.1, 34.2 of the precision interpolator unit 30 is shown in FIG. 3. As can be seen in FIG. 3, the FIR filter used corresponds to the customarily known FIR filter structures.

The foregoing description is provided to illustrate the invention, and is not to be construed as a limitation. Numerous additions, substitutions and other changes can be made to the invention without departing from its scope as set forth in the appended claims.

We claim:

1. An arrangement for generating command variables for control loops of a numerically controlled machine, comprising:

an interpolator unit for providing position set points with a defined interpolator scanning rate; and a precision interpolator unit comprising:
a scanning rate converter; and
a downstream-connected low-pass filter, wherein said precision interpolator unit is arranged downstream of said interpolator unit, which generates command variables at an output side from position set points at an input side for one or several downstream-connected control loops, wherein said precision interpolator unit generates command variables in a time pattern of said control loops with a control loop scanning rate.

2. The arrangement in accordance with claim 1, wherein said scanning rate converter increases an interpolator scanning rate of signals at said input side by a defined interpolation factor to a control loop scanning rate.

3. The arrangement in accordance with claim 1, wherein said low-pass filter comprises a Finite Impulse Response filter.

4. The arrangement in accordance with claim 3, wherein a number of filter coefficient sets are assigned to said Finite Impulse Response filter.

5. The arrangement in accordance with claim 4, wherein said number of filter coefficient sets corresponds to an interpolation factor.

6. The arrangement in accordance with claim 2, wherein said interpolator scanning rate is selected as a function of a machine-specific resonance frequency.

7. The arrangement in accordance with claim 1, wherein a signal supplied to said interpolator unit is band-limited.

8. The arrangement in accordance with claim 1, wherein said precision interpolator unit is embodied on a digital signal processor.

9. The arrangement in accordance with claim 1, wherein said precision interpolator unit is embodied on a central processing unit.

10. The arrangement in accordance with claim 1, wherein said precision interpolator unit comprises at least two parallel processing channels, in which respective command variables for position and speed are generated, which can be processed by downstream-arranged position and speed control loops, and wherein each one of the processing channels comprises a scanning rate converter, as well as a downstream-connected digital low-pass filter.

11. The arrangement in accordance with claim 1, wherein respectively one or several retardation members are arranged in said precision interpolator unit, which assure that command variables for position and speed transmitted to a position control loop and a speed control loop are each correlated with a defined chronological basis.

12. The arrangement in accordance with claim 1, further comprising a synchronization unit arranged between said precision interpolator unit and said downstream-connected control loops, which performs a chronological synchronization of said generated command variables for various machine shafts.

13. The arrangement in accordance with claim 1, wherein said scanning rate converter inserts intermediate values of the value zero in the time pattern of the control loop scanning rate in the original time pattern.

14. The arrangement in accordance with claim 13, wherein said low-pass filter generates zero output values for each zero value present at the filter input.

15. An arrangement for generating command variables for control loops of a numerically controlled machine, comprising:

an interpolator unit for providing position set points with a defined interpolator scanning rate; and a precision interpolator unit comprising:
a scanning rate converter which increases an interpolator scanning rate of signals at its input side by a defined interpolation factor to a control loop scanning rate to generate an output signal by inserting intermediate values of the value zero in the time pattern of the control loop scanning rate in the original time pattern; and
a downstream-connected digital low-pass filter receiving said output signal from said scanning rate converter to generate command variables at its output side for one or several downstream connected control loops, wherein said command variables are generated in a time pattern of said control loop with a control loop scanning rate.

16. The arrangement in accordance with claim 15, wherein said low-pass filter comprises a Finite Impulse Response filter.

17. The arrangement in accordance with claim 16, wherein a number of filter coefficient sets are assigned to said Finite Impulse Response filter.

18. The arrangement in accordance with claim 17, wherein said number of filter coefficient sets corresponds to an interpolation factor.

19. The arrangement in accordance with claim 15, wherein said low-pass filter generates zero output values for each zero value present at the filter input.

* * * * *